United States Patent [19]

Marsh et al.

[11] 3,831,358
[45] Aug. 27, 1974

[54] BELT AND CONNECTING MEANS THEREFOR

[75] Inventors: Richard L. Marsh; Roy E. Semin, both of Lincoln, Nebr.

[73] Assignee: The Goodyear Tire & Rubber Company, Akron, Ohio

[22] Filed: May 4, 1972

[21] Appl. No.: 250,262

[52] U.S. Cl.............. 56/291, 15/80, 24/31 C, 24/33, 74/231 J, 85/7, 198/151, 198/175, 198/177 R
[51] Int. Cl.............................................. A01d 55/24
[58] Field of Search............. 56/290, 291, 292, 244, 56/245; 198/140, 151, 152, 168, 175, 176, 177, 178; 74/231 J; 85/7, 8.3; 24/31 R, 31 B, 31 C, 31 H, 33 R, 33 V; 15/80, 99, 146, 160, 171, 186, 187, 188

[56] References Cited
UNITED STATES PATENTS

| 746,659 | 12/1903 | Barnes | 198/177 R |
|---|---|---|---|
| 1,402,560 | 1/1922 | Anthony | 24/33 B |
| 1,647,370 | 11/1927 | Mitchell | 198/177 R |
| 2,111,053 | 3/1938 | Olsen | 24/31 C |
| 2,256,155 | 9/1941 | Smith | 24/33 |
| 2,405,378 | 8/1946 | Thomas | 198/140 |
| 2,571,811 | 10/1951 | Andrews | 56/119 X |
| 2,637,436 | 5/1953 | Andrews | 56/119 X |
| 2,679,063 | 5/1954 | Hoffman | 15/186 |
| 3,346,900 | 10/1967 | Stewart et al. | 15/160 |
| 3,594,998 | 7/1971 | Grarersen | 56/290 |
| 3,610,407 | 10/1971 | Prodzenski | 198/175 X |
| 3,699,757 | 10/1972 | Hulburt | 56/291 |

Primary Examiner—Russell R. Kinsey
Attorney, Agent, or Firm—F. W. Brunner; R. P. Yaist

[57] ABSTRACT

An improved combination of a belt and connecting means for the belt for securing accessory attachments thereto. The belt includes a body of flexible resilient material having one or more grooves of arcuate configuration extending into and across one surface of the belt. The connecting means includes a connector member extending through and projecting beyond the portion of the belt adjacent the arcuate surface of the groove and a bearing member attached to one end of the connector member. The bearing member engages the groove and has an arcuate portion substantially conforming to at least a portion of the arcuate surface of the groove to provide for a substantially uniform distribution of stresses over the arcuate surface of the groove as the belt flexes during use. Accessory elements such as cutting blades, rake fingers, pick-up hooks and the like may be attached to the connector member to be carried by the belt as it travels around spaced pulleys.

22 Claims, 16 Drawing Figures

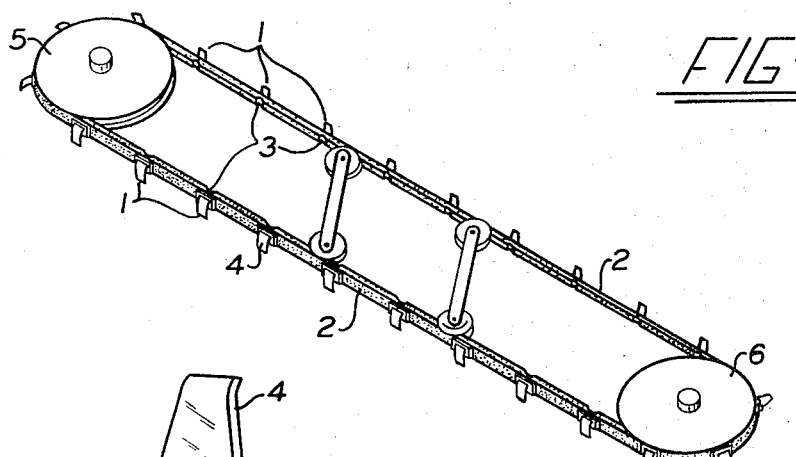
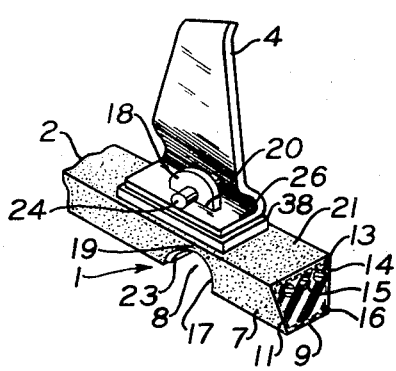
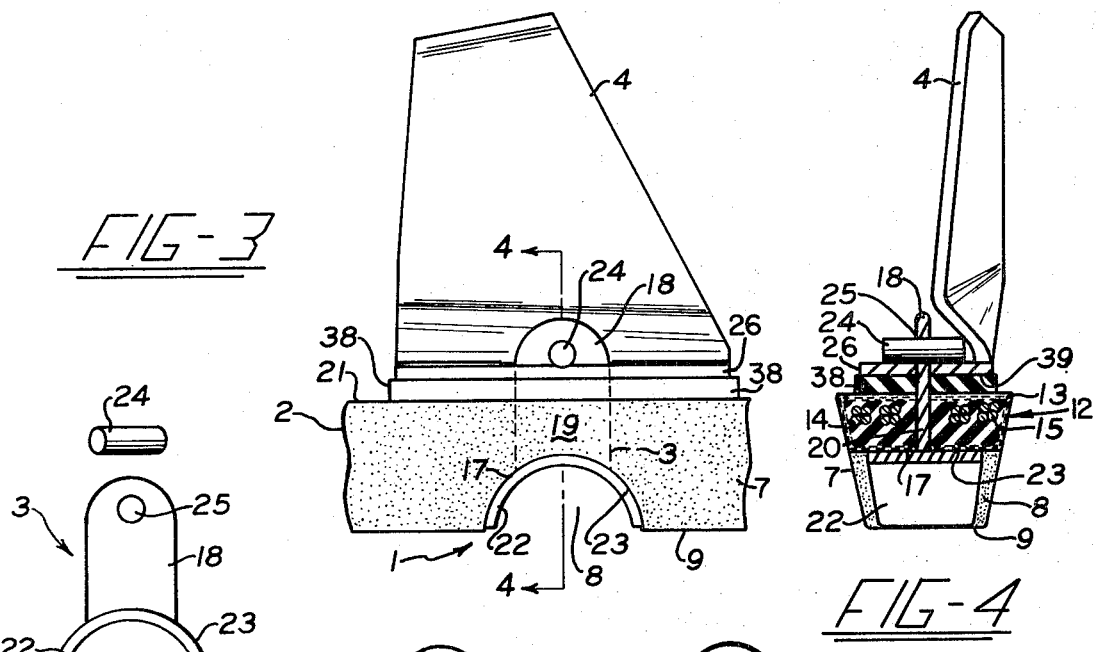
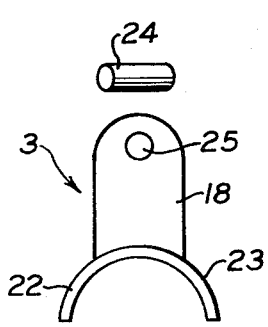
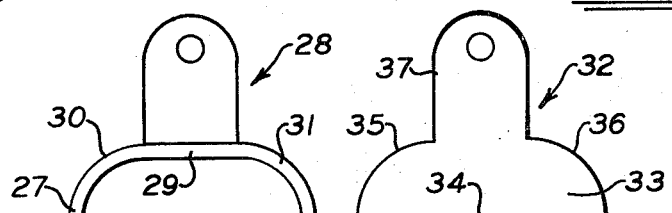
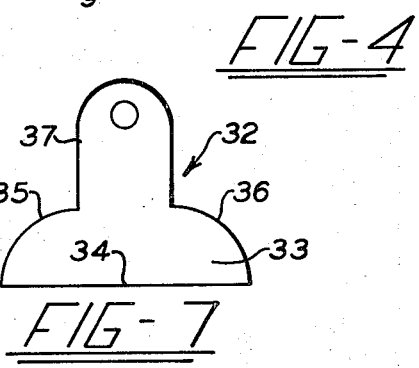

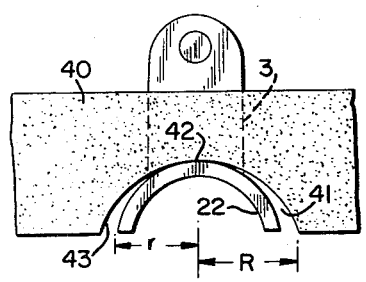
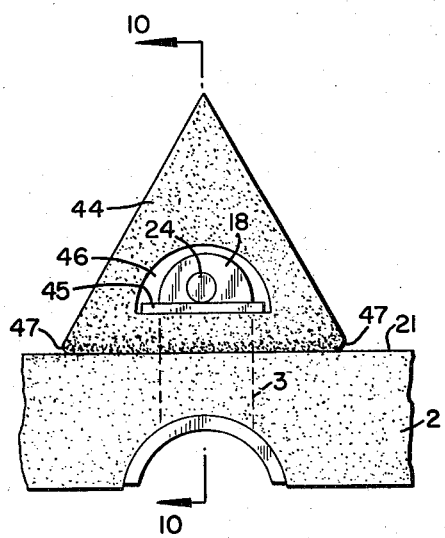
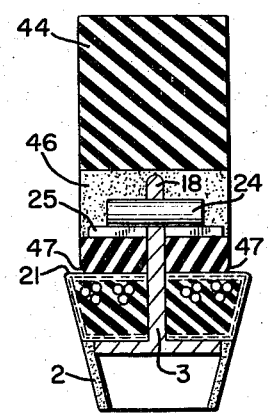
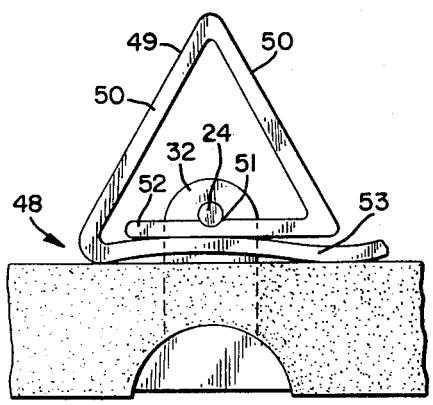
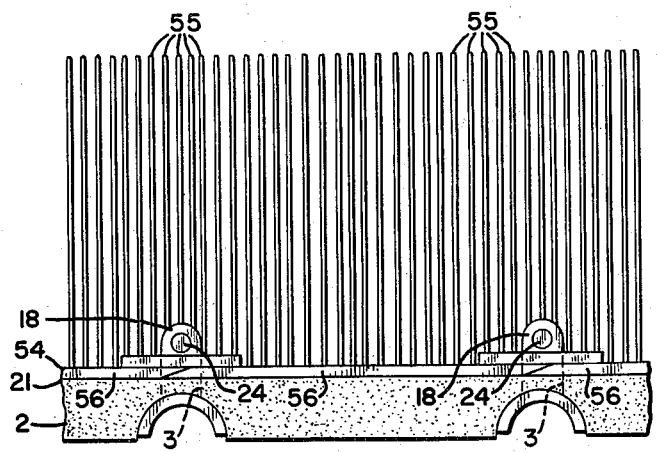
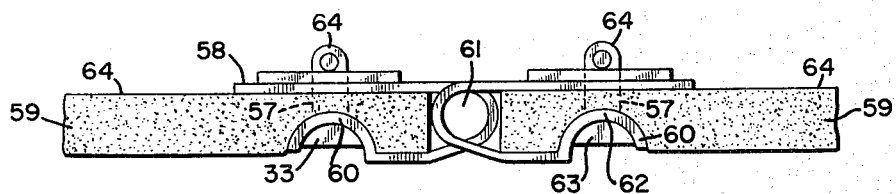

BELT AND CONNECTING MEANS THEREFOR

BACKGROUND OF THE INVENTION

This invention relates to belts and accessory connecting or fastening means which are secured to the belts. More specifically, this invention relates to combinations of a belt and accessory connecting devices adapted to have accessories attached thereto, such as cutting blades, rake fingers, pick-up hooks and elevator buckets to name a few.

Belts equipped with means such as connecting elements for securing attachments to the belt are well known in the art. For example, U.S. Pat. No. 3,545,188, issued Dec. 8, 1970, to N. C. Locati, relates to an impact mowing apparatus in which an endless elastomeric V-belt includes a plurality of structures to which cutting blades are attached. U.S. Pat. No. 3,651,626, issued on Mar. 28, 1972 based on a continuation-in-part application of the application which matured into this prior art patent, relates to a flexible reinforced power transmission belt having rigid T-shaped connectors molded into the belt at spaced intervals. In addition, U.S. Pat. No. 3,641,751, issued Feb. 15, 1972, to Locati, et al, also discloses an elastomeric V-belt mounted on swathers or mowers which carry side sharpenable cutters secured to the belts by means of clamping or fastening structures which may or may not be an integral part of the cutters.

The accessory clamping or fastening device itself has conventionally included an elongated rigid stem-like member or tang which is inserted through a slot in the belt extending from the outer surface of the belt to its inner surface. One end of the tang extends beyond the inner surface of the belt and may be secured to the belt by a wider relatively flat base portion attached to the tang which either conforms to the planar belt surface or alternately is molded into the body of the belt. A separate flat washer or other suitable element may also be used for this purpose. Another means of securing the connecting device to the belt has been to insert the tang through a slot in the V-belt and lock it in place by means of a transverse roll pin of spring metal which is inserted through aligned holes in the side of the V-belt and tang. The other end of the tang extends outwardly from the outer surface of the belt and is adapted to be attached or connected to accessory elements such as a cutting blade or alternatively the tang may be an integral part of the body of the cutting blade itself. Sometimes more than one such stem or tang is provided. The prior art devices of this type all have had more or less the same disadvantage in that they have failed prematurely under the high stresses they have been subjected to during the operation of the belt.

Since the endless belt travels around spaced pulleys in a mowing machine or other similar apparatus, it undergoes a great amount of flexing and, consequently, the accessory connecting device is subjected to high concentrations of stresses during the operation of the belt. Particularly high stresses occur at the interface between the rigid base of the metal tang and the belt or the rigid washer or roll pin member which secures the tang to the inner surface of the belt. Moreover, when the cutting blade or other element connected to the connecting or fastening device strikes a hard object, it is subjected to shock and additional stress is encountered. These stress conditions can lead to the premature failure of the connecting device and damage to the belt. Much of the excessive stress encountered in prior art devices can be attributed to the point contact between the sharp edges of the components of the connecting structure and the surface of the belts to which these devices are mounted. This has been particularly true of the planar base portions of the tang and the washers which have been used in some embodiments of prior art devices. In addition, the prior art devices of the type described have lacked suitable shock-absorbing features. Many of the present accessory connecting assemblies and carrier belts, due to these disadvantages, have required replacement when the element being carried by the belt has been broken, since the shock received by the element has been transferred to the connecting device, resulting also in its failure and damage to the belt.

The disadvantages, as previously discussed, are overcome by the use of an improved combination belt and connecting means of the present invention, as will be hereinafter described.

OBJECTS OF THE INVENTION

It is an object of the present invention to provide an improved combination of a belt and accessory connecting means secured or attached to the belt which will allow for a more equal distribution of stresses at the interfaces between the rigid connecting device and the flexible belt body to result in a longer service life.

It is another object of the present invention to provide an improved accessory connecting or fastening assembly for a belt with the assembly being of a structure which will decrease or prevent stress concentrations during the operation of the belt.

It is still another object of this invention to provide a combination of a belt and connecting device secured thereto which will be suitable for the attachment of a variety of elements to be carried by the belt.

It is still a further object of this invention to provide a combination of a belt and accessory connecting assembly having improved shock-absorbing properties to resist shocks occurring when elements attached to the connecting assembly strike hard objects during the operation of the belt.

It is still another object of this invention to provide an improved combination belt and accessory connecting device for the attachment of elements to be carried by the belt which, when the elements are broken, often will not require replacement of the carrier belt.

Other objects and advantages of this invention will become apparent hereinafter as the description thereof proceeds, the novel features, arrangements and combinations being clearly pointed out in the specification as well as the claims thereunto appended.

It has been found that these foregoing objects are accomplished by providing an improved combination belt and accessory connecting means for securing attachments thereto with the belt comprising a body of flexible resilient material extending throughout the length of the belt and having one or more grooves extending into and across the body from one surface thereof with at least the innermost portion of the surface of the groove being of arcuate configuration. The connecting means is more rigid than the body of the belt and comprises a connector member extending through and projecting beyond the portion of the body adjacent the arcuate surface of the groove, and a bearing member attached to one end of the connector member and engaging the groove with the bearing member having an arcuate portion substantially conforming to at least a portion of the arcuate surface of the groove to provide for a substantially uniform distribution of stresses over the arcuate surface of the groove as the belt flexes during use. The belt normally includes a plurality of such transverse grooves disposed along the length of the belt, and connecting devices are attached to the belt and engage at least some of the grooves. Preferably the maximum depth of the groove is from about 30 to about 70 percent of the thickness of the body of the belt and even more preferably, the maximum depth of the groove is from about 45 to about 65 percent of the thickness of the body of the belt.

Accessory elements may be attached to the connector member of the connecting means and are carried by the belt as it travels around spaced pulleys.

The combination belt and accessory connecting means may also include shock-absorbing means disposed on the opposite surface of the belt from the surface of the belt containing the grooves and in vertical alignment therewith. The connecting means is inserted through the shock-absorbing means with one surface of the shock-absorbing means engaging the opposite surface of the belt. The body has a durometer hardness equal to or less than the durometer hardness of the elastomeric material of the belt so that the body thereby acts to absorb shocks resulting from the element striking against hard objects.

BRIEF DESCRIPTION OF THE DRAWINGS

In the drawings:

FIG. 1 is a perspective view with parts broken away illustrating an endless belt having a plurality of accessory connecting devices secured thereto in accordance with the invention;

FIG. 2 is an enlarged perspective view of a portion of the invention shown in FIG. 1;

FIG. 3 is a side elevational view of the invention shown in FIG. 2;

FIG. 4 is a section taken on line 4—4 of FIG. 3;

FIG. 5 is an elevational view of a connecting device of the present invention;

FIGS. 6 and 7 show modifications of the connecting device of FIG. 5;

FIG. 8 shows a modification of a part of the invention shown in FIG. 3;

FIG. 9 shows another modification of the invention shown in FIG. 3;

FIG. 10 is a section taken on line 10—10 of FIG. 9; and

FIGS. 11–16 show various other embodiments of the invention similar to FIGS. 1–3 in which various accessory attachments are shown.

DESCRIPTION OF THE PREFERRED EMBODIMENTS

Figure 14:
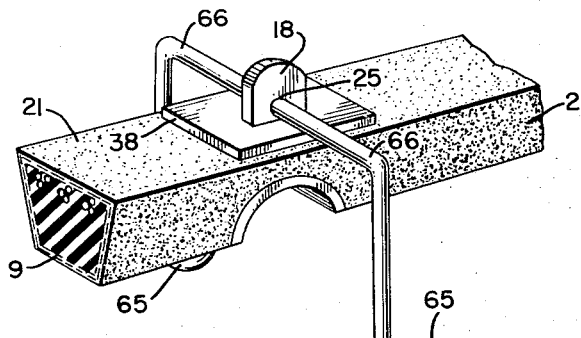

In FIGS. 1–4, the improved combination belt and accessory connecting means 1 of this invention is shown which is formed by an endless belt 2 having a plurality of connecting or fastening devices 3 secured thereto. The accessory elements 4 which in this case are cutting blades are attached or connected to the devices 3 and are carried by the belt 2 as it travels around the spaced pulleys 5 and 6. The belt arrangement shown in FIG. 1 may be mounted on various equipment such as a mowing machine or other industrial or agricultural apparatus (not shown).

The combination belt and accessory connecting means 1 of this invention is best seen in FIGS. 2–4. The belt 2 includes a body 7 of flexible resilient material such as natural rubber, synthetic rubber, or the like which extends throughout the length of the belt and includes one or more grooves or notches 8 extending transversely across the body 7 in one surface 9 of the belt. The belt 2 as illustrated is a standard B section power transmission belt of the V-type, for example, having a compression section 11 composed of a highly fiber-loaded elastomeric compound and including a fabric envelope 12 of two plies 13 and 14 comprised, for example, of a blended cotton and nylon woven fabric impregnated with rubber. A plurality of longitudinally extending cord strength members 15 are contained within the neutral axis section 16 of the belt. These cords 15 are ordinarily composed of polyester tire cord fabric. The belt 2 typically has a major width of 0.656 of an inch, a minor width of 0.399 of an inch and a height or thickness of 0.406 of an inch. It is to be understood that many other types and sizes of belts may be used in the present invention including power transmission belts of both the V and flat type and conventional conveyor belts of a type well known in the art, all of which are provided with transverse notches or grooves. In addition, many other materials may be used to form the various belt components with the materials previously discussed being only exemplary of suitable materials for this purpose.

The grooves 8 are preferably disposed at right angles to the longitudinal axis of the belt 2 with at least the innermost portion of the surface 17 of each groove being of arcuate configuration. As illustrated, it is preferred that the grooves 8 be of a semicircular configuration. The grooves should extend into the body 7 of the belt to a maximum depth of about one-half of the belt's height or thickness. In the preferred belt construction, the depth of the groove 8 is from about 30 to about 70 percent of the thickness of the belt and this ratio is even more preferably from about 45 to about 65 percent. For example, it has been found that a power transmission belt of the V-type having a thickness of 0.406 of an inch may be provided with semicircular grooves having a maximum depth of 0.206 of an inch. The grooves 8 may be provided in the body 7 of the belt 2 by any of the well-known techniques, for example, by molding during vulcanization of the belt or by a cutting operation after the belt has been cured or vulcanized.

The connecting or fastening devices 3 of the present invention include a stem-like rigid connector member or tang 18 preferably formed of metal extending through and projecting beyond the portion 19 of the body 7 of the belt 2 disposed adjacent to the arcuate surface 17 of the groove 8. This is accomplished by providing a slot 20 which extends through the belt 2 from its outer face or surface 21 to the innermost portion of the surface 17 of the arcuate groove 8. The slot 20 has substantially equal cross-sectional dimensions to the cross-sectional dimensions of the tang 18 in order that it may be conveniently received therein. The connecting device 3 also includes a rigid bearing member or metal base plate 22 attached to one end of the projection 18 with the plate 22 engaging the groove 8. The plate 22 has at least one outer arcuate portion 23 conforming at least substantially to the arcuate surface 17 of the groove 8. With particular reference to FIG. 3, the arcuate portion 23 is aligned for engagement with substantially the entire arcuate surface 17 of the groove 8 and the radius of curvature of the surface of the arcuate portion 23 which bears against the surface 17 of the groove 8 is not less than the depth of the arcuate portion of the groove 8. Rather, as is specifically illustrated in FIG. 3, the radius of curvature of the surface of the arcuate portion 23 is greater than the depth of the arcuate portion of the groove 8. Also, in the specific embodiment illustrated in FIG. 3, the tang 18 has a maximum width or cross-sectional dimension that is less than twice the radius of curvature of the surface of the portion 23 of the plate 22 which bears against the arcuate surface 17 of the groove 8. The rolling line contact between the confronting arcuate surfaces of the groove 8 and plate 22 provides for a substantially uniform distribution of stresses over the arcuate surface 17 of the groove 8 as the belt 2 flexes during use also as best seen in FIG. 3. The plate or bearing member 22 should be of a similar semicircular cross-sectional configuration to that of each groove 8 into which it is disposed with the bearing member or plate 22 having a center of curvature which is disposed at or outwardly of the surface 9 of the belt 2 containing the groove 8 and is not disposed within the groove. In addition, the plate 22 should also be of a width in a direction transversely of the belt to contact at least a substantial portion of the width of the groove 8 so that the plate 22 conforms to the semicircular grooves 8 along a substantial portion of the area of the arcuate surface 17 thereof. For instance, the groove may have a maximum width of about 19/32 of an inch and the plate may have a transverse width of about 13/32 of an inch. The devices 3 may also be formed from a stiff cast or injection molded material such as nylon suitable for light-duty applications.

A rigid accessory element such as a cutting blade 4 as shown in FIGS. 2-4 may be attached to the connector member or tang 18 by means of a cylindrical metal rolling pin 24 inserted through a hole 25 in the end of the tang 18 which extends beyond the outer surface 21 of the belt 2. In the embodiment illustrated, the blade 4 includes a base 26 having a surface which the pin 24 bears against to secure or clamp the blade 4 in place.

It is to be understood that the accessory element can be attached to the connector member 18 of the connecting device 3 by other well-known means such as by bolts or staples. Furthermore, the element may be formed as an integral part of the tang, for instance, by welding. Indeed it is to be considered within the scope of the present invention if the connector member of the device 3 itself be a working element. The device 3 as best shown in FIG. 5 is of an integral unitary construction made of a metal forging or stamping with the bearing member 22 affixed to the tang 18. The dimensions of the clamping device 3 will vary depending upon the particular belt with which it is used and perhaps with the size or weight of the attachment to be secured to the belt. When used with a V-belt having the previously cited dimension, the projecting tang 18 may be about 7/8 of an inch in length, about 3/8 of an inch wide and about 0.050 of an inch in thickness. The bearing plate 22 can, for example, be about 3/8 of an inch wide, about 0.030 to 0.050 of an inch thick and have an arc or radius of curvature at its outer arcuate surface 23 which contacts the groove 8 of 9/16 of an inch and an arc or radius of curvature at its inner surface of 7/16 of an inch.

Another embodiment of the connecting device adapted for the attachment of accessories to a belt is illustrated in FIG. 6 in which the arcuate bearing or base member 27 of the rigid clamping device 28 includes a substantially straight section 29 between two arcuate sections 30 and 31. In another form of connecting device 32 shown in FIG. 7, the bearing member 33 is of a half-round configuration with a straight-sided base 34 and curved or arcuate sides 35 and 36 which join the ends of the base to the elongated tang 37. The connecting devices 28 and 32 shown in FIGS. 6 and 7 respectively are of relatively the same dimensions as the device 3 of FIG. 5.

It should be apparent that other connecting structures may be used in combination with the grooved or notched belts to provide the improved combination belt and accessory connecting means of this invention. For example, the connecting device may be of separable components in which the bearing plate is a separate element and the connector member or tang is inserted through a slot provided in the bearing plate. This structure is of the type developed by Omark Industries, Inc of Portland, Ore. and is manufactured under the registered trademark Duraclamp. The connecting device may also be of other constructions. The tang, for example, rather than being a rectangular plate member as shown, may be a cylindrical bar or rod of an appropriate diameter.

Preferably, as best shown in FIGS. 2-4, a shock-absorbing means such as a pad 38 of elastomeric material is disposed between the bottom surface 39 of the blade base 26 and the outer surface of the belt 21 in vertical alignment with the grooves 8, and the tang 18 is inserted through the pad 38. The pad may be of rectangular cross-section as shown or may also be of a wedge-shaped, cross-sectional configuration with a slanting tapered upper surface. The pad 38 is typically 1 inch long, ½ of an inch wide and 3/16 of an inch thick. The pad 38 preferably has a durometer hardness equal to or less than the durometer hardness of the elastomeric material of the body of the belt so that the pad acts to absorb shocks resulting from the blade 4 or other attachment striking against hard objects during the operation of the belt 2.

As shown in FIG. 8, the endless transmission belt 40 may be provided with grooves 41 having a larger radius of curvature R than the radius of curvature r of the bearing plate 22 of the connecting device 3. In this embodiment of the invention, the device 3 has more freedom to flex and an increased rolling line contact results between the confronting arcuate surfaces of the groove 41 and plate 22. Thereby, the friction and resulting wear at the inner face 42 of the arcuate surface 43 of the groove 41 and the arcuate surfaces of the plate 22 is decreased. For example, the inner arcuate portion of the groove 41 may have an arc or radius R of ¾ of an inch and the outer arcuate surface of the plate 22 may have an arc or radius r of 9/16 of an inch. In this instance, it can be seen that the radius of curvature r of the bearing plate 22 is at least approximately equal to the depth of the arcuate surface 43 of the groove 41. It is to be understood that a shock-absorbing pad may also be provided in the embodiment of the invention shown in FIG. 8.

In the embodiment of the invention shown in FIGS. 9 and 10, the element connected or attached to the connecting device 3 is a solid triangularly shaped finger 44 of elastomeric material having a height of about 1¼ inches. A hole or opening, for example, of semicircular configuration is provided in the side of the finger and a small slotted metal plate 45 is inserted into the hole with its slot in alignment with a slot provided in the base of the finger 44. In order to attach the finger to the belt 2, the projecting tang 18 is inserted through the aligned slots in the finger and plate so that it extends into the finger 44 for a distance of about ½ of an inch. The pin 24 is positioned through the hole 25 in the tang 18 which serves to clamp the assembly in place. The lower or base portion 47 of the triangular finger 44 bears against the outer surface 21 of the endless transmission belt 2, thereby acting as a shock-absorbing body of elastomeric material which will absorb shocks resulting from the finger striking hard objects during the operation of the belt, for instance, as it travels around spaced pulleys.

FIGS. 11–16 illustrate some of the many attachments which may be secured to the combination belt and connecting device of this invention.

In FIG. 11 the combination belt and connecting device 48 is shown in which the attachment is an open triangular-shaped finger 49 formed by a single bent flat metal band 50 having a thickness of about 1/16 of an inch and a width of about ⅜ of an inch. The finger is secured to the belt 2 by means of the connecting device 32 of the type shown in FIG. 7. The roll pin 24 in this case rests in a small notch 51 provided in one segment 52 or bend of the band 50. In this connecting or clamping assembly, the segment 53 of the band 50 has sufficient resiliency to provide shock resistance without the use of a pad of elastomeric material. Typically, the finger may have a length or height of about 1¼ inches.

FIG. 12 shows an embodiment of the invention in which a slab 54 of elastomeric material containing a plurality of bristles or tines 55 encased or embedded therein is disposed on the outer surface 21 of the belt 2 and secured or fastened thereto by means of connecting devices 3. The bristles 55, for example, are made of a material such as nylon or metal and extend about 3 inches above the outwardly disposed surface 21 of the belt 2. Preferably, the slab 54 is in the form of injection molded sections 56 joined together by means of the tang 18 inserted through aligned slots provided in the slab 54 and are clamped in place by the roll pins 24 which bear against the upper surface of the ends of the molded slab sections 56. Typically, the slab sections 56 may be about 6 inches in length and about ⅛ of an inch thick and cover substantially the entire width of the surface 21 of the belt 2. Any number of these belt assemblies may be positioned in a side-by-side relationship to each other in order to function as a lawn sweeper or power rake.

FIG. 13 illustrates that the combination belt and connecting devices of this invention can also be used in a belt splicing arrangement. As shown, the connecting devices 57 secure separate flat metal bands 58 to the belt ends 59. The bands 58 have ends 60 adapted to be secured together by means of a pin 61 to provide a belt fastener or splice structure. Each band 58 is formed as an integral part of each connecting device 57 so that one portion 62 fits against the semicircular groove 63 of each belt end 59 thereby serving as the bearing member. The tang 65 is attached to the arcuate bearing member 62 of the band 58. The connecting or clamping assemblies may also include elastomeric shock-absorbing pads if desired. Alternatively, the band may be formed as a separate part of the connecting devices. Each band 58 may have a width of about ½ of an inch and a thickness of about 0.100 of an inch and is typically about 6 inches long when straightened.

FIG. 14 illustrates another attachment in the form of a pair of pick-up hooks 65 carried by the belt 2. In this arrangement the roll pin is replaced by an elongated element or bar 66, for example, having a diameter of ⅛ of an inch which is inserted in the hole 25 in the exposed protruding portion of the tang 18. The bar 66 may extend laterally outwardly for a distance of about 1 inch from each edge of the outer surface 21 of the belt 2 and the hooks 65 are suitably connected to the ends of the bar 66, for example, by means of a hinge and hang downwardly for a distance of about 1½ to 2 inches from the bar 66 so as to be disposed beneath the lower surface 9 of the belt 2. In this position various articles may be hung on the hooks 65 to be carried by the belt 2. The connecting structure preferably includes a shock-absorbing pad 38 which is contacted by the bar 66.

Figure 15:
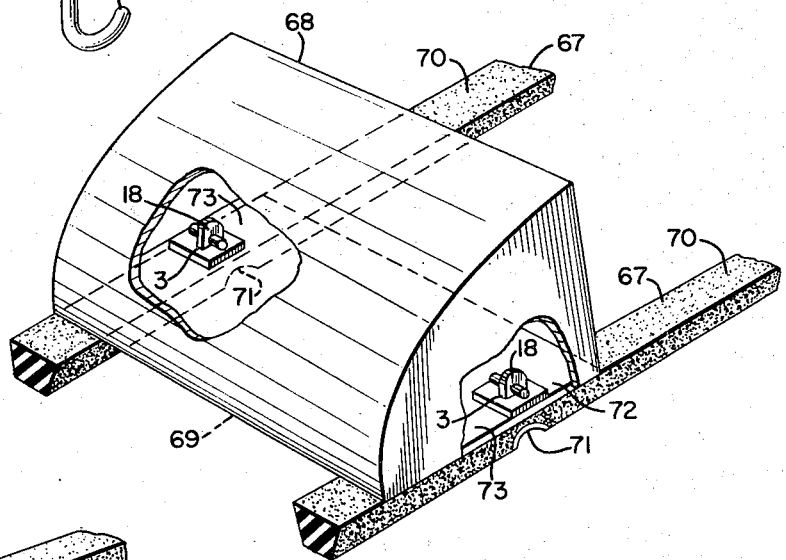

In FIG. 15 an arrangement is shown in which two parallel belts 67 disposed vertically or on an incline are equipped with connecting devices 3 to which a container or bucket 68 is attached having one side 69 resting against the outwardly disposed surfaces 70 of the belts 67. The belts 67 are disposed so that the transverse grooves 71 are in substantial alignment. The tangs or connector members 18 of the devices 3 are, for example, inserted through a slot provided in a plate 72 which forms the bottom side 69 of the bucket 68 and a pad 38 of elastomeric material may be provided so as to be disposed on the outer face 73 of the plate 72 with the roll pin 24 inserted through the tang 18 bearing against the pad 38. Typically the belts 67 may be positioned about 12 to 16 inches apart. A plurality of such buckets may be provided on the belts to form an elevator bucket arrangement to carry grain or other such commodities. It should be appreciated that instead of two or more V-belts as shown, if desired one conveyor belt of appropriate width may be provided having a similar notched construction as the belts 67.

Figure 16:
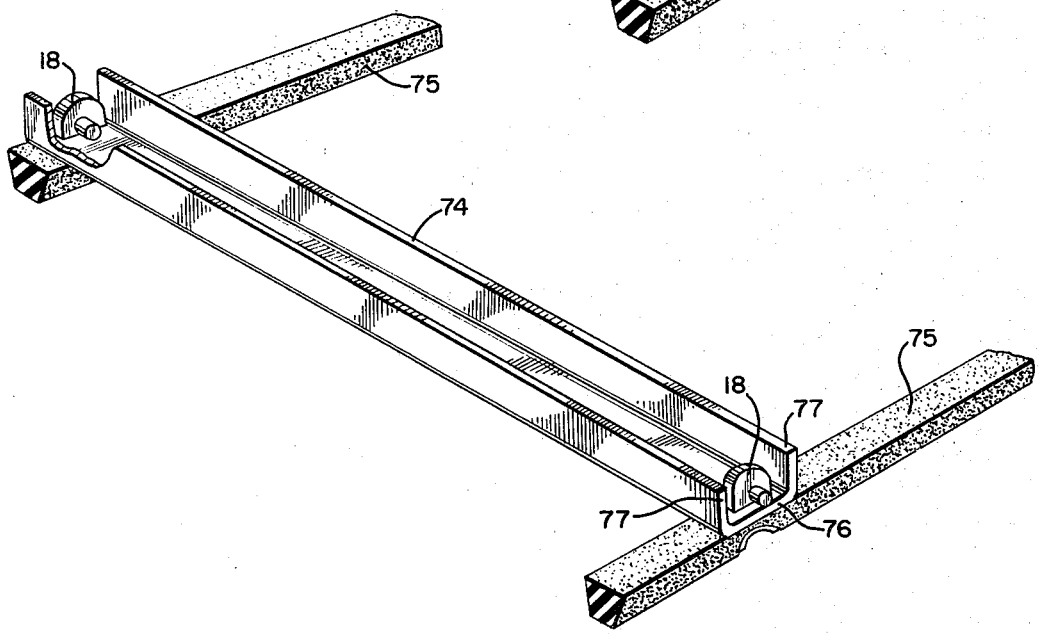

In the embodiment of the invention shown in FIG. 16 a generally U-shaped steel channel 74 is attached to a pair of parallel V-belts 75. The lateral end portions of the base 76 of the channel 74 is secured to each belt 75 by a connecting device 3 in accordance with the present invention. The channels 74 may have a base 76 having a width of about 1 inch with legs 77 extending upwardly from the outer surface of the belt a distance of about ¼ of an inch. The belts 75 can be positioned 6 or 7 feet apart and a number of channels may be fastened along the length of the belts with the belts being operated over a flat steel bed (not shown) to scoop up, carry and discharge feed or other material as the belts travel. For example, multiple belts may be provided in parallel relationship with the channels being disposed across any two belts in either end-to-end or in a staggered arrangement (not shown). This particular belt assembly may be used as a feed house conveyor on a combine or as a forage apron. In addition, one wide conveyor belt of suitable construction may replace the multiple V-belts as discussed previously.

It should be apparent to those skilled in the art that the improved combination of a belt and connecting means secured to the belt as disclosed in the present invention provides a structure for the attachment of various accessory elements or implements to the belt which is of longer life and less affected by stresses that have caused premature failure of previous devices of this type. It should be further apparent to those skilled in art that the improved combination belt and connecting assembly of this invention has improved shock-absorbing properties and often will not require replacement when the attached element is broken or damaged.

While certain representative embodiments and details have been shown for the purpose of illustrating the invention, it will be apparent to those skilled in the art that various changes and modifications may be made therein without departing from the spirit or scope of the invention.

I claim:

1. An improved combination of a belt and connecting means for securing attachments thereto, said belt comprising a body of flexible resilient material extending throughout the length of said belt and having one or more grooves extending transversely across said body in one surface thereof, at least the innermost portion of the surface of said groove being of arcuate configuration, said connecting means being more rigid than said body and comprising a connector member extending through and projecting beyond the portion of said body adjacent the arcuate surface of said groove, and a bearing member attached to one end of said connector member and engaging said groove, said bearing member having an arcuate portion substantially conforming to at least a portion of the arcuate surface of said groove, said arcuate portion being aligned for engagement with substantially the entire said arcuate surface, and the radius of curvature of the surface of said arcuate portion which bears against the surface of said groove being equal to or greater than the depth of the arcuate portion of said groove to provide for substantially uniform distribution of stresses over the arcuate surface of said groove as the belt flexes during use.

2. The improved combination as claimed in claim 1 wherein an accessory element is attached to the connector member of said connecting means and is carried by the belt as it travels around spaced pulleys.

3. The improved combination as claimed in claim 1 wherein said connecting means is a unitary member of integral structure in which said bearing member is affixed to said connector member.

4. The improved combination as claimed in claim 1 wherein said groove and said bearing member are of semicircular configuration and said bearing member has a center of curvature which is disposed at or outwardly of the surface of the belt containing said groove and is not disposed within said groove.

5. The improved combination as claimed in claim 1 wherein the maximum depth of said groove is from about 30 to about 70 percent of the thickness of said body.

6. The improved combination as claimed in claim 1 wherein said body is of a trapezoidal cross-section.

7. The improved combination as claimed in claim 1 wherein said connecting means is comprised of metal.

8. The improved combination as claimed in claim 1 wherein said connecting means is comprised of nylon.

9. The improved combination as claimed in claim 2 wherein said element is a cutting blade.

10. The improved combination as claimed in claim 2 wherein said element is a metal band of a triangular configuration.

11. The improved combination as claimed in claim 2 wherein said element is at least one slab of elastomeric material having a plurality of bristle members encased therein.

12. The improved combination as claimed in claim 2 wherein said element is an elongated rod inserted through a hole in the projecting portion of said connector member, said rod having at least one hook member attached thereto.

13. The improved combination as claimed in claim 2 wherein two said belts are provided and said element is a bucket member having one side thereof attached to the surface of said belts opposite to that of the surface having said groove therein.

14. The improved combination as claimed in claim 2 wherein said belt is not endless and the belt ends are aligned in an end-to-end relationship and said element is a pair of steel bands joined together to thereby connect the belt ends to provide an endless belt.

15. The improved combination as claimed in claim 2 wherein at least two said belts are provided in side-by-side relationship and said element is at least one channel member extending across two said belts and secured to each belt.

16. The improved combination as claimed in claim 2 wherein shock-absorbing means is disposed on the opposite surface of said belt from the surface having said grooves and in vertical alignment therewith and said connecting means is inserted through said shock-absorbing means with one surface of said shock-absorbing means engaging the opposite surface of said belt, said shock-absorbing means having a durometer hardness equal to or less than the durometer hardness of the elastomeric material of the body of the belt to thereby act to absorb shocks resulting from the element striking against hard objects.

17. The improved combination as claimed in claim 4 wherein said bearing member is of a semicircular configuration and is of a width in a direction transversely of the belt to contact at least a substantial portion of the width of the arcuate surface of said groove so that said member thereby conforms to the semicircular groove along a substantial portion of the area of the arcuate surface thereof.

18. The improved combination as claimed in claim 4 wherein said groove has a greater radius of curvature than the radius of curvature of said bearing member.

19. The improved combination as claimed in claim 16 wherein said body is a pad of elastomeric material having one surface which bears against the opposite surface of the belt and another surface which is contacted by a portion of said element.

20. The improved combination as claimed in claim 16 wherein said belt further includes an elastomeric element into which the connector member is inserted and said shock-absorbing means is the base of said elastomeric element.

21. In an endless belt which travels around spaced pulleys including a combination of at least one belt and an accessory connecting device for securing attachments to the belt, said belt having a body of flexible resilient material and at least one connecting device attached to the body of the belt, said connecting device including a rigid projecting tang inserted through the body of the belt, the improvement wherein said body includes one or more grooves formed in and extending across one surface thereof, at least the innermost portion of the surface of each groove being of arcuate configuration with said tang extending through said body adjacent the arcuate surface of said groove and projecting beyond the belt surface opposite to that which contains the grooves, and said connecting device further including a rigid bearing plate engaging one end of said tang to maintain it in position with respect to one of said grooves, said bearing plate having at least a portion thereof conforming to the arcuate surface of said groove and aligned for engagement with substantially the entire said arcuate surface, said tang having a maximum cross-sectional dimension that is less than twice the radius of curvature of the surface of the portion of said bearing plate which bears against said arcuate surface of said groove and the radius of curvature of the surface of the portion of said bearing plate which bears against said arcuate surface being equal to or greater than the depth of said arcuate surface to substantially uniformly distribute the stresses over the arcuate surface of said groove as the belt flexes during use.

22. The improvement as claimed in claim 21 wherein said belt includes a plurality of transverse grooves disposed along the length of the belt and connecting devices attached thereto.

* * * * *

PO-1050
(5/69)

UNITED STATES PATENT OFFICE
CERTIFICATE OF CORRECTION

Patent No. 3,831,358   Dated August 27, 1974

Inventor(s) Richard L Marsh and Roy E Semin

It is certified that error appears in the above-identified patent and that said Letters Patent are hereby corrected as shown below:

Column 10, line 57, change "body" to --shock-absorbing means--.

Signed and sealed this 17th day of December 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

PATENT NO. : 3,831,358
DATED : August 27, 1974
INVENTOR(S) : Richard L Marsh and Roy E Semin It is certified that error appears in the above–identified patent and that said Letters Patent are hereby corrected as shown below:

Column 6, line 1, "9/16" should read --9/32--;

Column 6, line 2, "7/16" should read --7/32--;

Column 6, line 60, "3/4" should read --3/8--;

Column 6, line 62, "9/16" should read --9/32--.

Signed and Sealed this ninth Day of September 1975

[SEAL]

Attest:

RUTH C. MASON
Attesting Officer

C. MARSHALL DANN
Commissioner of Patents and Trademarks